Nov. 12, 1935.  R. P. LIER  2,020,841
ATTACHMENT FOR LISTERS, ETC
Filed May 23, 1935
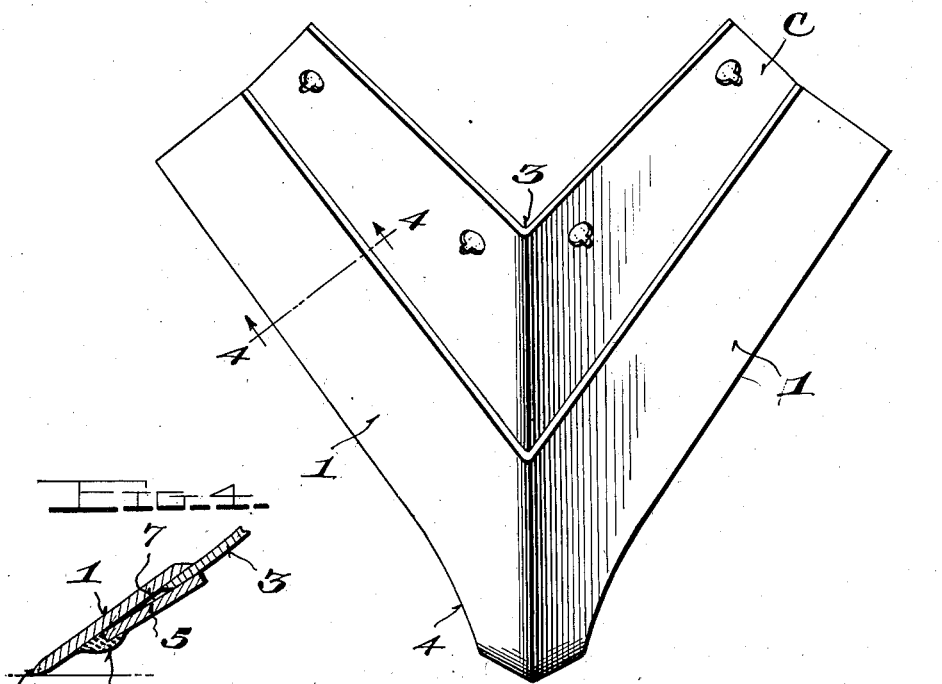
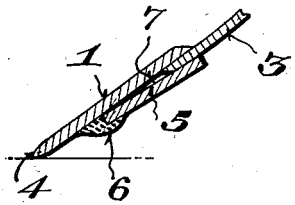
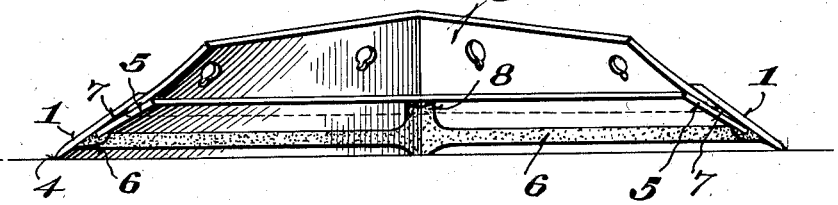
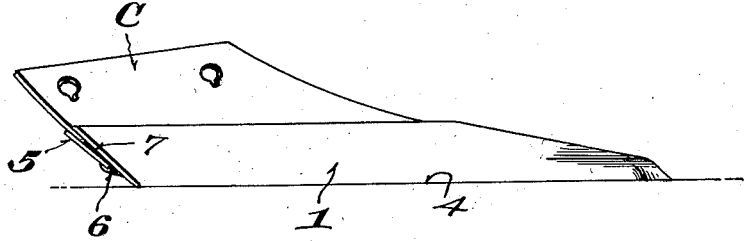
Inventor
Robert P. Lier,
By A. W. Freeman
Attorney Patented Nov. 12, 1935

2,020,841

UNITED STATES PATENT OFFICE 2,020,841

ATTACHMENT FOR LISTERS, ETC.

Robert P. Lier, Mitchell, S. Dak., assignor of two-thirds to Richard Burn and Alexander McIntosh, Mitchell, S. Dak.

Application May 23, 1935, Serial No. 23,086

1 Claim. (Cl. 97—125)

This invention relates to attachments for listers, cultivators, shovels, potato diggers, middle busters, and the like, and the primary object thereof is to provide a cutting attachment to renew the cutting edges, which can be readily applied to the lister, or cultivator, or the like and which is frictionally held thereon so that same may be easily and quickly removed or applied.

A further object of the invention is to provide an attachment of this type which is securely held in position and to also provide an attachment which is of simple, economical and rugged construction.

The invention has further and other objects which will be later set forth and manifested in the course of the following description.

In the drawing:

Fig. 1 is a perspective view of the invention applied in position;

Fig. 2 is a rear elevation;

Fig. 3 is a side elevation; and

Fig. 4 is a section on line 4—4 of Fig. 1.

In proceeding in accordance with the present invention the attachment is formed of a member of substantially V-shape, having like sides 1—1, the apex of which are in alinement with the angle 3 of the V-shaped cultivator or lister or the like C. The sides 1 are sharpened as indicated at 4 to provide cutting edges and are provided with rectangular strips 5 welded at 6 to the inner faces thereof. As depicted clearly in Figs. 2 and 4 the free or upper sides of the strips 5 are inclined with respect to the sides 1 of the attachment so that the lower sides of the cultivator C are receivable in the spaces 7, resultant from the above described relationship between the sides 1 and the strips 5. The lower ends of the strips 5 are mitered or bevelled and are welded together at 8, at points opposite the apex of the cultivator so that there is a pocket formed in the bight of the attachment which affords a secure and effective frictional grip of the attachment with the apex of the cultivator. It will be further noted that the strips 5 act as guides in applying the attachment.

From the foregoing it will be seen that the invention provides an attachment which is of simple, economical and virtually integral construction. It will further be noted that the attachment can be easily and quickly applied to the cultivator or the like and that in use the resistance offered by the earth in movement of the attachment therethrough tends to more firmly, through friction, hold the attachment in its position.

What is claimed is:

In an attachment for listers and cultivators, a substantially V-shaped member having the lower edges of its sides sharpened to form cutting edges, and a pair of rectangular strips welded to the inner faces of said sides and having portions spaced from said inner faces of said sides to receive the sides of the lister in said spaces, and to frictionally engage the lister sides between the confronting portions of the strips and sides of said member, the outer ends of said strips being welded together at points opposite the apex of the member to form a pocket in conjunction with the apex of said member to receive and frictionally engage the point of the lister.

ROBERT P. LIER.